(12) United States Patent
Fan

(10) Patent No.: US 10,038,630 B2
(45) Date of Patent: Jul. 31, 2018

(54) NETWORK SYSTEM AND SOFTWARE UPDATING METHOD

(71) Applicants: Qisda (Suzhou) Co., Ltd., Suzhou, Jiangsu (CN); Qisda Corporation, Taoyuan (TW)

(72) Inventor: Yu-Fu Fan, Hsinchu (TW)

(73) Assignees: Qisda (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 140 days.

(21) Appl. No.: 15/335,451

(22) Filed: Oct. 27, 2016

(65) Prior Publication Data

US 2017/0126554 A1   May 4, 2017

(30) Foreign Application Priority Data

Oct. 29, 2015  (TW) .............................. 104135547 A

(51) Int. Cl.
*H04L 12/16* (2006.01)
*H04L 12/771* (2013.01)
*H04L 12/24* (2006.01)
*H04L 29/08* (2006.01)

(52) U.S. Cl.
CPC .......... *H04L 45/563* (2013.01); *H04L 41/082* (2013.01); *H04L 41/0859* (2013.01); *H04L 67/34* (2013.01)

(58) Field of Classification Search
CPC ........... H04M 2203/052; H04L 12/243; H04L 41/082; H04N 2005/4437
See application file for complete search history.

(56) References Cited

FOREIGN PATENT DOCUMENTS

| CN | 1784038 | 6/2006 |
|----|---------|--------|
| TW | I364208 | 5/2012 |
| TW | I462017 | 11/2014 |
| TW | I480729 | 4/2015 |

*Primary Examiner* — Alvin Zhu
*Assistant Examiner* — Bo Hui A. Zhu

(57) ABSTRACT

A network system includes a terminal device, a first router, a second router, a first border router, a second border router and a server. The server transmits an updating software to the first and the second border routers through an Internet network. The first border router transmits the updating software to the first router and the second border router transmits the updating software to the second router. The first router transmits the updating software to the terminal device and the second router transmits the updating software to the terminal device. When a version information of the updating software received from the first router and that received from second router are identical, the terminal device executes the updating software. When the version information of the updating software received from the first router and that received from the second router are different, the terminal device does not execute the updating software.

18 Claims, 9 Drawing Sheets

NETWORK SYSTEM AND SOFTWARE UPDATING METHOD

BACKGROUND OF THE INVENTION

1. Field of the Invention

The present invention relates to a network system and a software updating method, and more particularly, to a network system and a software updating method for correctly updating a software through an Internet network.

2. Description of the Prior Art

The Internet of Things (IoT) is a network based on the information carriers, such as the Internet network and the traditional telecommunication network, etc., for general physical objects with individual address to communicate with each other. The IoT is generally implemented by wireless network. Since there may be thousands of devices surrounding each person, the IoT may includes enormous numbers of objects. Within the IoT, each physical object can be connected and its location can be found by an electronic label. Through the IoT, machines and devices can be managed and controlled by a central computer, and household appliances and vehicles can be remotely controlled. As the development speed of the hardware becomes faster, the software needs to be updated so as to support the new hardware. It is therefore quite important to ensure correct software updating.

SUMMARY OF THE INVENTION

One of the purposes of the present invention is to provide a network system and a software updating method for correctly updating a software via an Internet network to solve the aforementioned problems.

According to one embodiment of the present invention, the network system includes a terminal device, a first router, a second router, a first border router, a second border router and a server. The server transmits an updating software to the first and second border routers through an Internet network. The first border router transmits the updating software to the first router and the second border router transmits the updating software to the second router. The first router transmits the updating software to the terminal device and the second router transmits the updating software to the terminal device. When a version information of the updating software received from the first router and that received from second router are identical, the terminal device executes the updating software. When the version information of the updating software received from the first router and that received from the second router are different, the terminal device does not execute the updating software.

According to another embodiment of the present invention, the software updating method includes the steps of: transmitting an updating software from a server to a first border router and a second border router, respectively, through an Internet network; transmitting the updating software from the first border router to a first router and transmitting the updating software from the second border router to a second router; transmitting the updating software from the first router to a terminal device and transmitting the updating software from the second router to the terminal device; determining whether a version information of the updating software received from the first router and that received from the second router by the terminal device are identical; and executing the updating software by the terminal device when determining the version information of the updating software received from the first router and that received from the second router by the terminal device are identical; or determining not to execute the updating software by the terminal device when the version information of the updating software received from the first router and that received from the second router by the terminal device are not identical.

In sum, the server transmits the updating software to the terminal device through different border routers and routers, respectively, and the terminal device executes the updating software only when the terminal device determines that the version information of the updating software received from different router are identical. To the contrary, the terminal device would not execute the updating software when the terminal device determines the version information of the updating software received from different routers are not identical or the updating software is received only from a single router. By this, the updating software is correctly transmitted, received and executed, and undesired or malicious software updating by a third party can be avoided.

The above-mentioned and other objectives of the present invention will no doubt become obvious to those of ordinary skill in the art after reading the following detailed description of the preferred embodiment that is illustrated in the various figures and drawings.

DETAILED DESCRIPTION OF PREFERRED EMBODIMENTS

Figure 1:
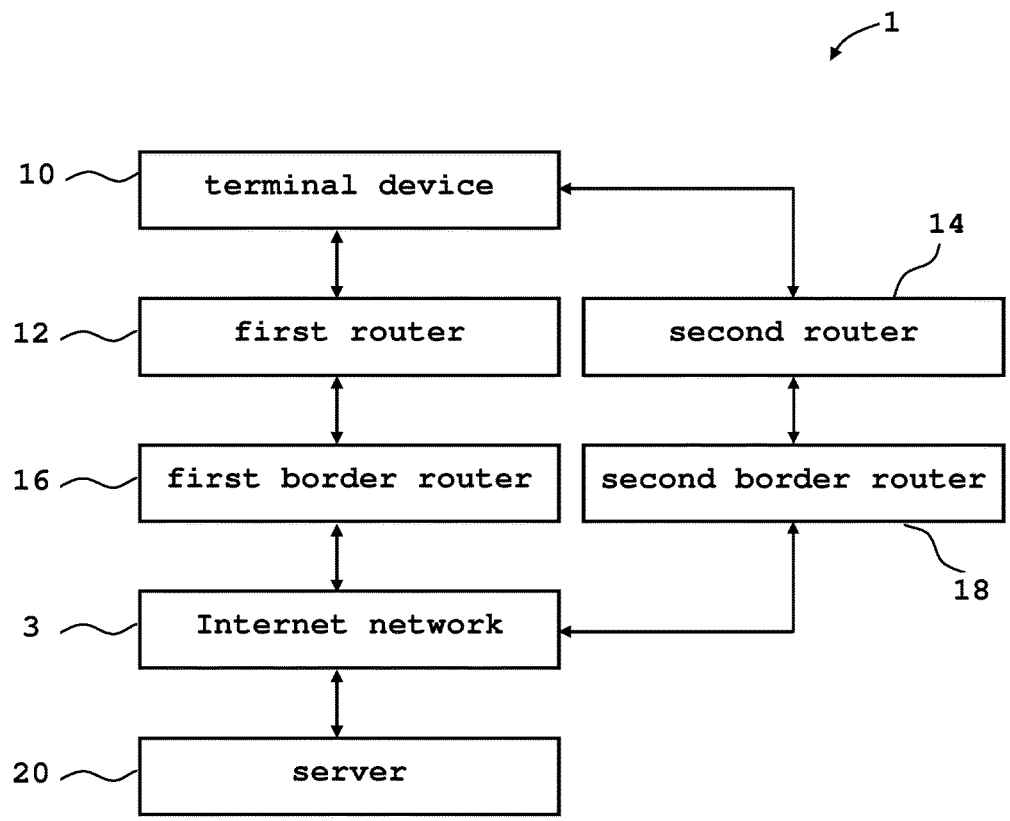
FIG. 1 is a functional block diagram of a network system according to an embodiment of the present invention.
Figure 2:
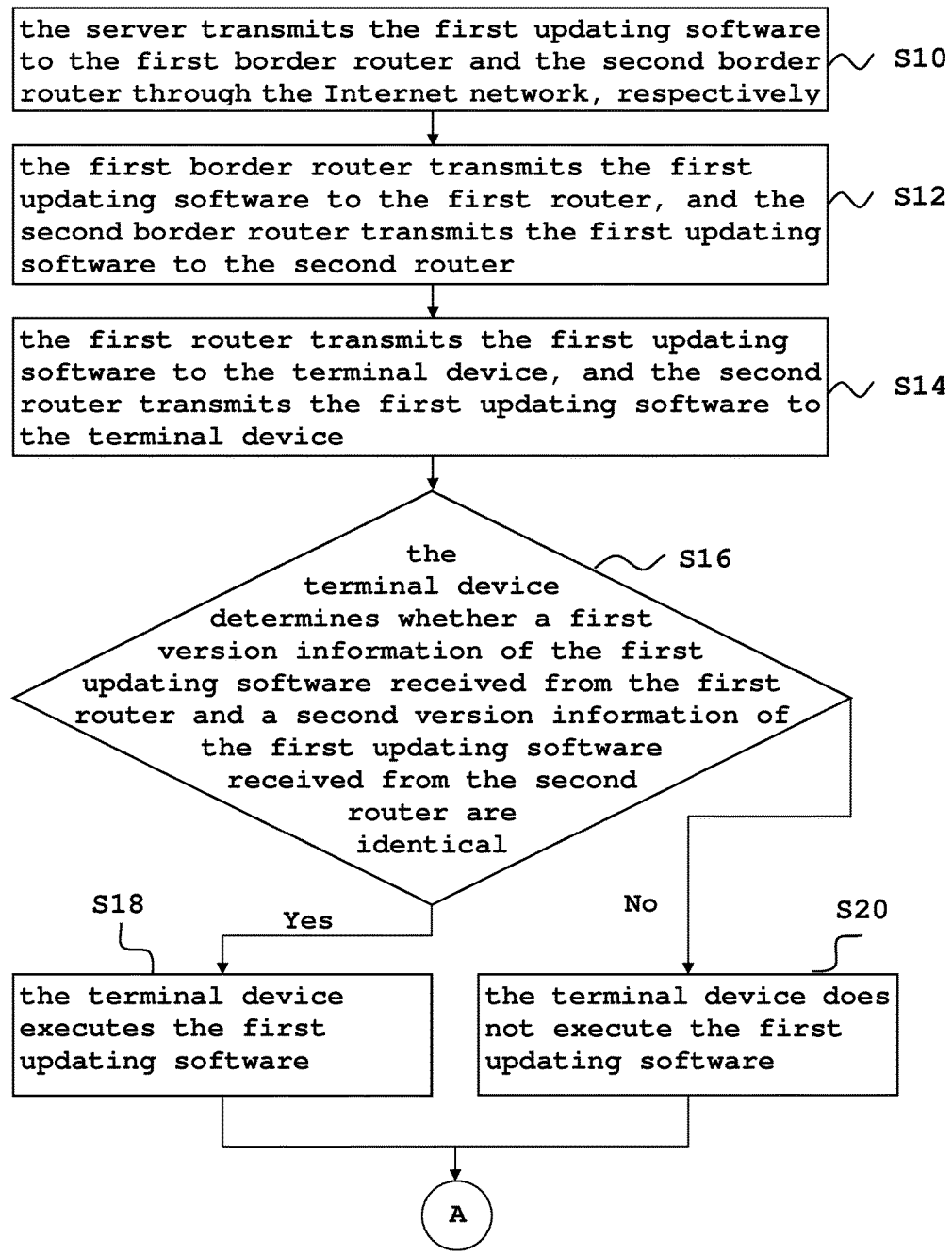
FIG. 2 is a part of a flowchart of a software updating method according to an embodiment of the present invention.
Figure 3:
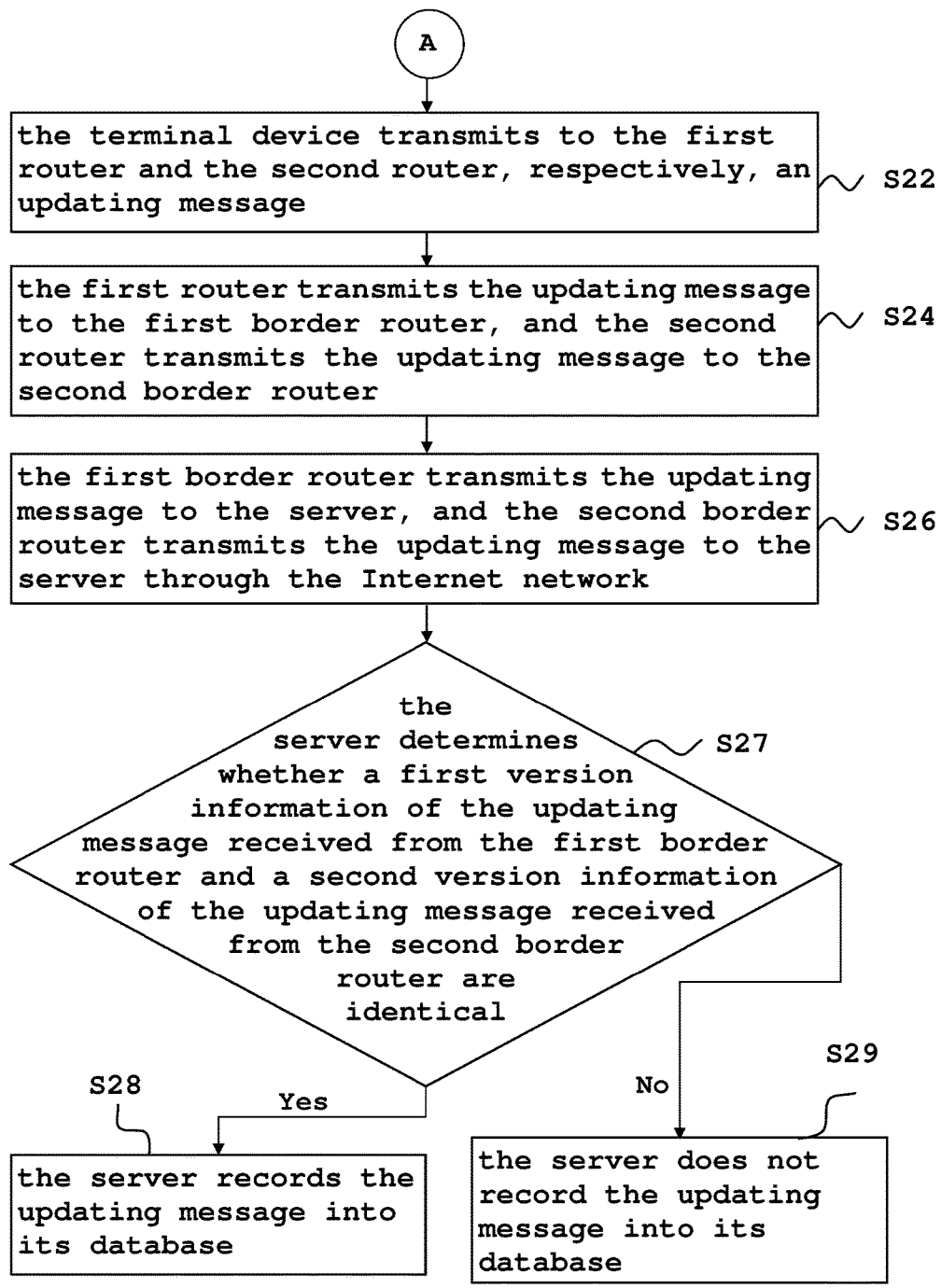
FIG. 3 is another part of the flowchart of the software updating method according to the embodiment of the present invention.

Please refer to FIG. 1 through FIG. 3. FIG. 1 is a functional block diagram of a network system 1 according to an embodiment of the present invention. FIG. 2 is a part of a flowchart of a software updating method according to an embodiment of the present invention. FIG. 3 is another part of the flowchart of the software updating method according to the embodiment of the present invention. The software updating method of FIGS. 2 and 3 is applicable to the network system 1 of FIG. 1.

As shown in FIG. 1, the network system 1 includes a terminal device 10, a first router 12, a second router 14, a first border router 16, a second border router 18 and a server 20. The first router 12 is coupled to the terminal device 10, and the second router 14 is also coupled to the terminal device 10. The first border router 16 coupled to the first router 12, and the second border router 18 coupled to the second router 14. The server 20 communicates with the first border router 16 and the second border router 18 through an Internet network 3. In the embodiment of the present invention, the terminal device 10 may be a mobile phone, a household appliance, a computer or other types of electronic device depending upon actual applications. Since the construction, the combination and the function of the router, the border router and the server are well known by the people having ordinary skill in the art, they are not repeatedly described in details herein.

When the server 20 stores a first updating software for software updating of the terminal device 10, the server 20 transmits the first updating software to the first border router 16 and the second border router 18 through the Internet network 3 as shown in step S10 of FIG. 2. After the first border router 16 and the second border router 18 receive the first updating software, respectively, the first border router 16 and the second border router 18 respectively record a version information of the first updating software into their databases. The first border router 16 then transmits the first updating software to the first router 12, and the second border router 18 transmits the first updating software to the second router 14 shown in step S12 of FIG. 2. The first router 12 and second router 14 respectively record the version information of the first updating software into their databases. Then the first router 12 transmits the first updating software to the terminal device 10, and the second router 14 transmits the first updating software to the terminal device 10 as shown in step S14 of FIG. 2. The terminal device 10 determines whether the version information of the first updating software received from the first router 12 and that received from the second router 14 are identical as shown in step S16 of FIG. 2. When the terminal device 10 determines the version information of the first updating software received from the first router 12 and that received from the second router 14 are identical, the terminal device 10 executes the first updating software as shown in step S18 of FIG. 2. When the terminal device 10 determines the version information of the first updating software received from the first router 12 and that received from the second router 14 are not identical, the terminal device 10 would not execute the first updating software as shown in step S20 of FIG. 2.

Since the server 20 transmits the first updating software to the terminal devices through two paths, i.e. through the first and the second border routers 16, 18 and then the first and the second routers 12 and 14, respectively, the terminal device 10 would execute the first updating software only when the terminal device 10 determines the version information of the first updating software received from aforementioned two paths are identical. To the contrary, when the terminal device 10 determines the version information of the updating software received from the first router 12 and that received from the second router 14 are not identical or the updating software is received only from a single router, i.e. either of the first router 12 and the second router 14, the terminal device 10 would not execute the updating software. By this, the software is correctly transmitted, received and executed, and undesired or malicious software updating by a third party can be avoided.

After the terminal device 10 executes or determines not to execute the first updating software, the terminal device 10 may further transmits to the first router 12 and the second router 14, respectively, an updating message indicating the software updating process is finished or terminated as shown in step S22 of FIG. 3. The the first router 12 transmits the updating message to the first border router 16, and the second router 14 transmits the updating message to the second border router 18 as shown in step S24 of FIG. 3. The first border router 16 transmits the updating message to the server 20 through the Internet network 3, and the second border router 18 transmits the updating message to the server 20 through the Internet network 3 as shown in step S26 of FIG. 3. The server 20 then determines whether a version information of the updating message received from the first border router 16 and that received from the second border router 18 are identical as shown in step S27 of FIG. 3. When the version information of the updating message received from the first border router 16 and that received from the second border router 18 are identical, the server 20 records the updating message into its database as shown in step S28 of FIG. 3. When the version information of the updating message received from the first border router 16 and that received from the second border router 18 are not identical, the server 20 would not record the updating message into its database as shown in step S29 of FIG. 3. By this, the manager of the server 20 and/or the user of the terminal device 10 understand the software updating status via the updating message.

Figure 4:
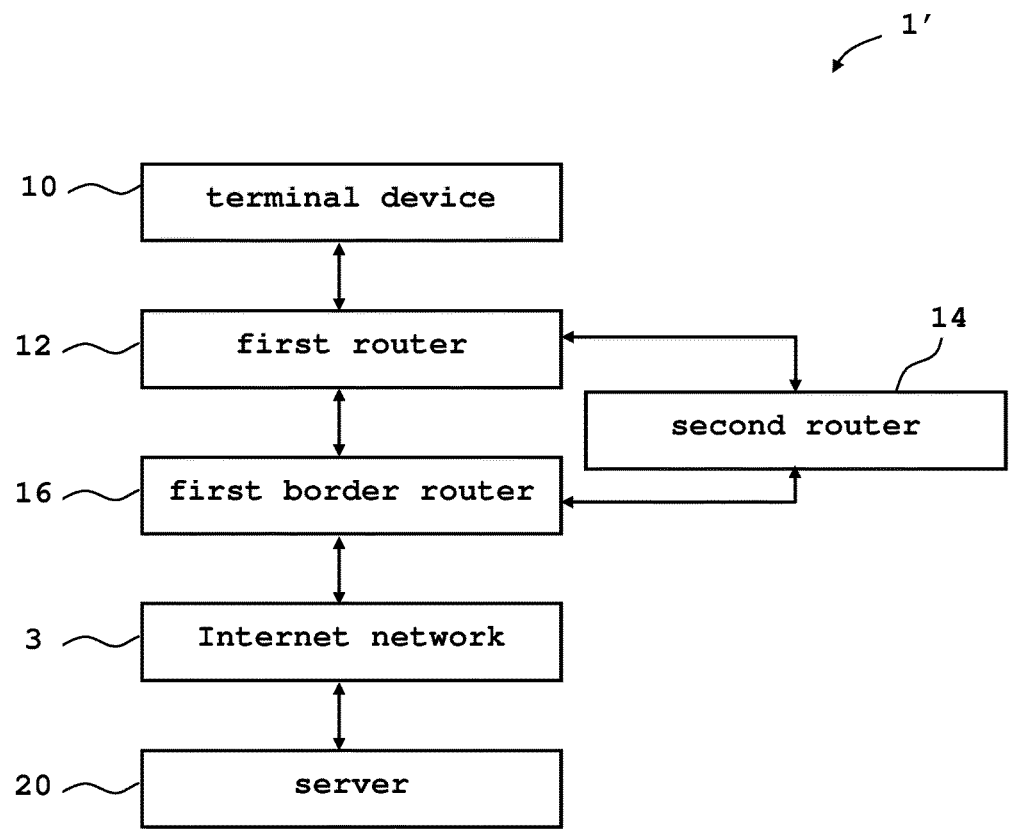
FIG. 4 is a functional block diagram of a network system according to another embodiment of the present invention.
Figure 5:
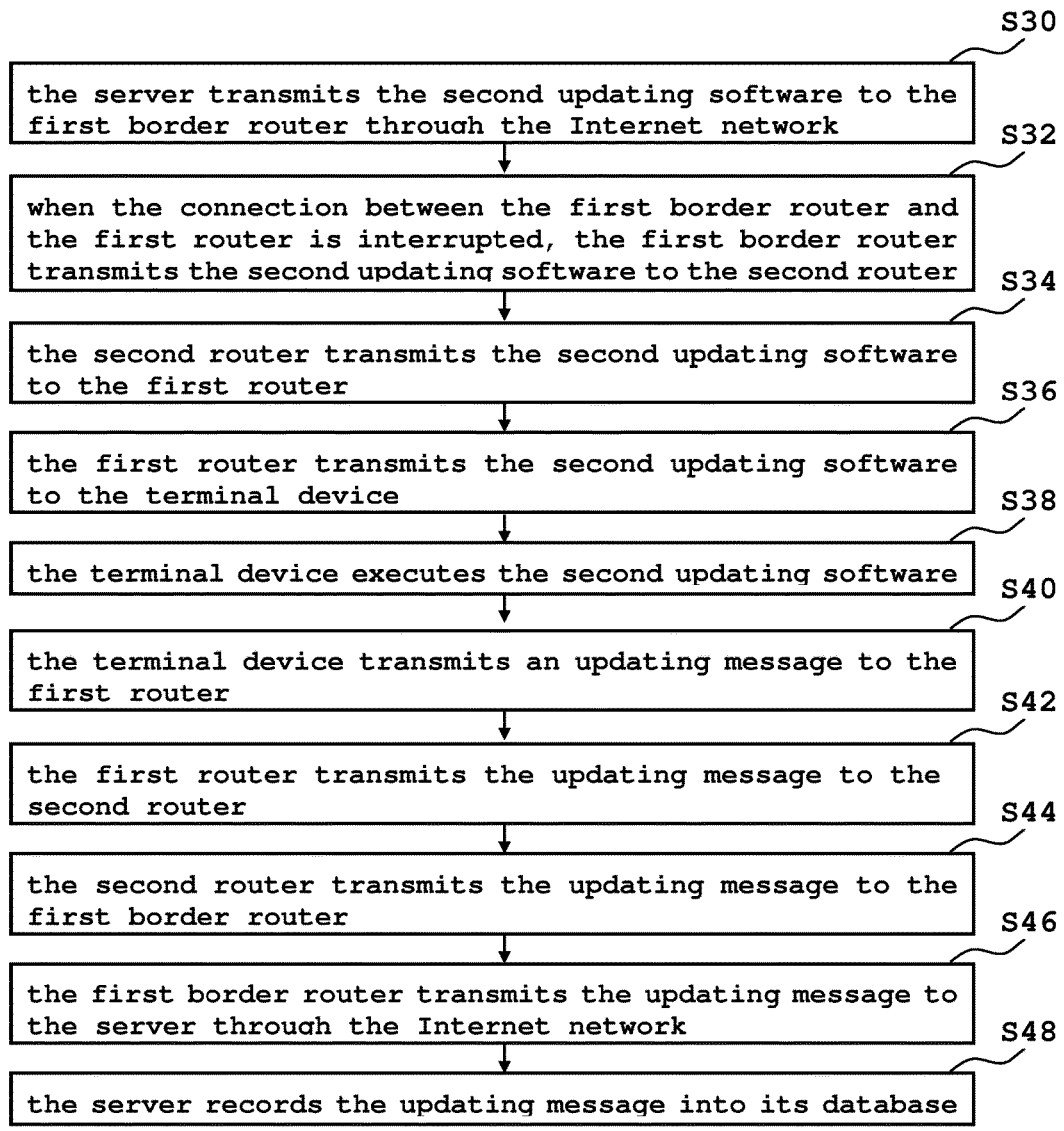
FIG. 5 is a flowchart of a software updating method according to another embodiment of the present invention.

Please refer to FIG. 4 and FIG. 5. FIG. 4 is a functional block diagram of a network system 1' according to another embodiment of the present invention. FIG. 5 is a flowchart of a software updating method according to another embodiment of the present invention. The software updating method of FIG. 5 is applicable to the network system 1' of FIG. 4. The network system 1' and the aforementioned network system 1 differ in that the network system 1' does not include the second border router 18, the first border router 16 coupled to the second router 14, and the second router 14 is coupled to the first router 12 as shown in FIG. 4. In the embodiment of the present invention, when the server 20 stores a second updating software for software updating of the terminal device 10, the server 20 transmits the second updating software to the first border router 16 through the Internet network 3 as shown in step S30 of FIG. 4. After the first border router 16 receives the second updating software, the first border router 16 records a version information of the second updating software into its database. When the first border router 16 finds the connection between the first border router 16 and the first router 12 is interrupted, the first border router 16 alternatively transmits the second updating software to the second router 14 as shown in step S32 of FIG. 4. Since the second router 14 is coupled to the first router 12, the second router 14 transmits the second updating software to the first router 12 as shown in step S34 of FIG. 4. Once the first router 12 receives the second updating software, the first router 12 records the version information of the second updating software into its database. Then the first router 12 transmits the second updating software to the terminal device 10 as shown in step S36 of FIG. 4. The terminal device 10 then receives and executes the second updating software as shown in step S38 of FIG. 4.

In other words, since the second router 14 is coupled to the first border 16 and the first router 12, even when the connection between the first border router 16 and the first router 12 is interrupted, the first border router 16 can still transmit the second updating software to the first router 12 through the second router 14. The first router 12 then transmits the second updating software to the terminal device 10 for software updating.

Besides, after the terminal device 10 executes the second updating software, the terminal device 10 may transmit an updating message indicating success of software updating to the first router 12 as shown in step S40 of FIG. 4. Since the connection between the first router 12 and the first border router 16 is interrupted, the first router 12 alternatively transmits the updating message to the second router 14 as shown in step S42 of FIG. 4. The second router 14 then transmits the updating message to the first border router 16 as shown in step S44 of FIG. 4. The first border router 16 transmits the updating message to the server 20 through the Internet network 3 as shown in step S46 of FIG. 4. Finally the server 20 records the updating message into its database as shown in step S48 of FIG. 4. By this, the manager of the server 20 and/or the user of the terminal device 10 understand the software updating status via the updating message.

Figure 6:
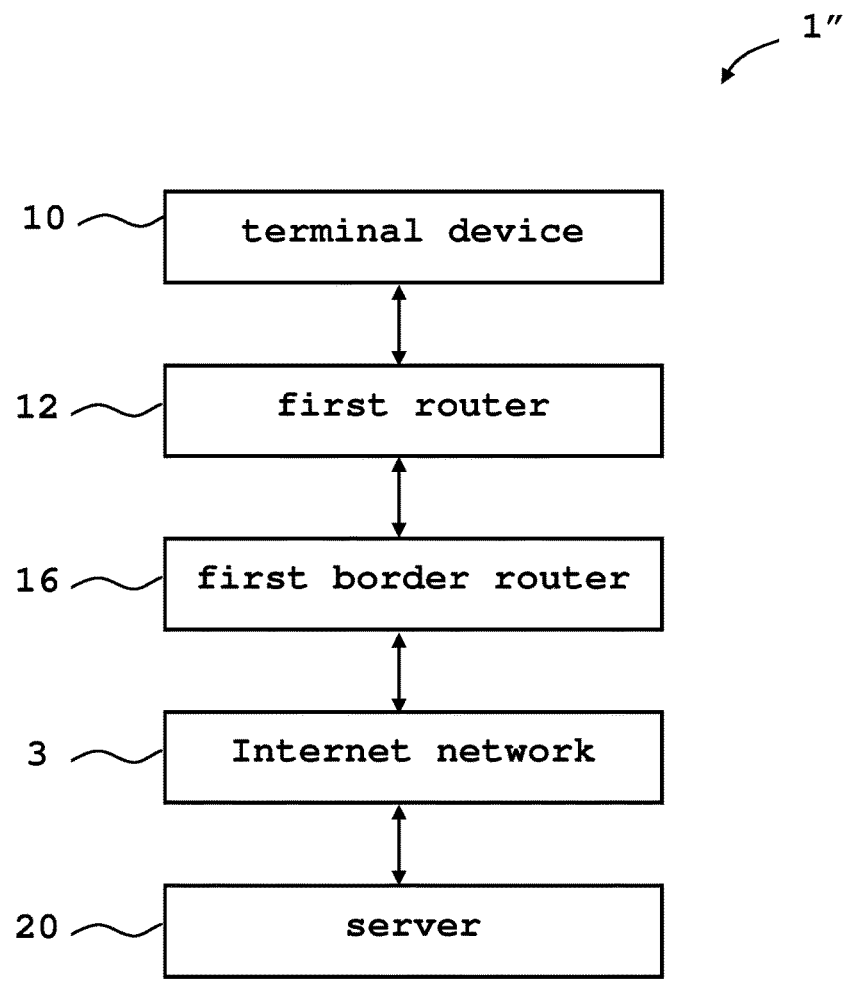
FIG. 6 is a functional block diagram of a network system according to another embodiment of the present invention.
Figure 7:
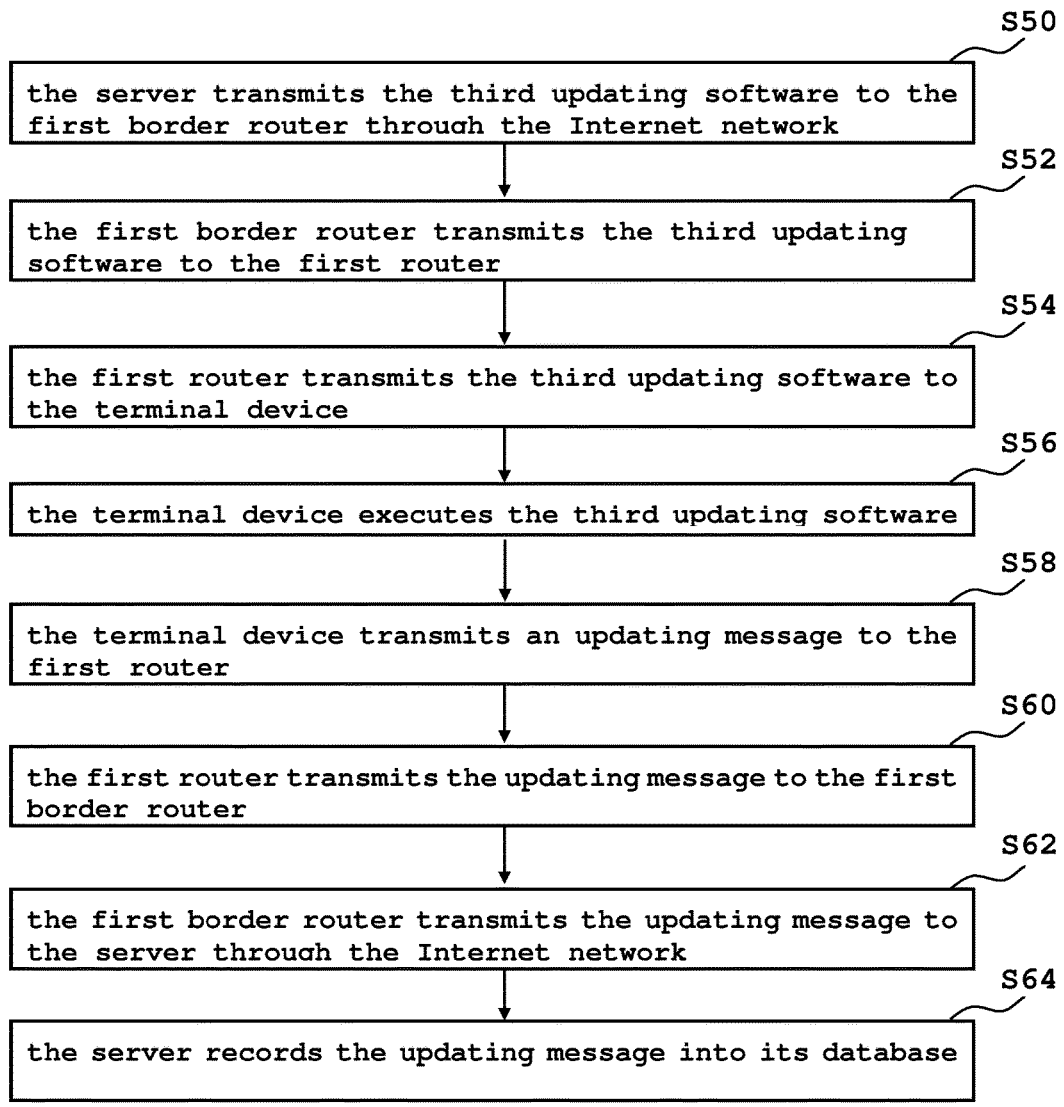
FIG. 7 is a flowchart of a software updating method according to another embodiment of the present invention.

Please refer to FIG. 6 and FIG. 7. FIG. 6 is a functional block diagram of a network system 1" according to another embodiment of the present invention. FIG. 7 is a flowchart of a software updating method according to another embodiment of the present invention. The software updating method of FIG. 7 is applicable to the network system 1" of FIG. 6. The network system 1" and the aforementioned network system 1 differ in that the network system 1" does not include the second router 14 and the second border router 18 as shown in FIG. 6. In the embodiment of the present invention, when the server 20 stores a third updating software for software updating of the terminal device 10, the server 20 transmits the third updating software to the first border router 16 through the Internet network 3 as shown in step S50 of FIG. 7. After the first border router 16 receives the third updating software, the first border router 16 records a version information of the third updating software into its databases. The first border router 16 then transmits the third updating software to the first router 12 as shown in step S52 of FIG. 7. After the first router 12 receives the third updating software, the first router 12 records the version information of the third updating software into its databases. The first router 12 transmits the third updating software to the terminal device 10 as shown in step S54 of FIG. 7. The terminal device 10 then receives and executes the third updating software as shown in step S56 of FIG. 7.

In other words, when the first router 12 and the first border router 16 operate normally, the server 20 is able to transmit the third updating software to the terminal device 10 through the first border router 16 and the first router 12 for software updating of the terminal device 10. Please note that when the first router 12 transmits the third updating software to the terminal device 10, if the terminal device 10 is in a sleep mode, the first router 12 keeps the third updating software in a queue first. The queue may be incorporated in the first router 12, or exists separately in the network system 1" and is coupled to the first router 12. Once the terminal device 10 is awakened from the sleep mode, the first router 12 then transmits the third updating software kept in the queue to the terminal device 10.

After the terminal device 10 executes the third updating software, the terminal device 10 may further transmit an updating message indicating success of software updating to the first router 12 as shown in step S58 of FIG. 7. The first router 12 transmits the updating message to the first border router 16 as shown in step S60 of FIG. 7. The first border router 16 then transmits the updating message to the server 20 through the Internet network 3 as shown in step S62 of FIG. 7. Finally the server 20 records the updating message into its database as shown in step S64 of FIG. 7. By this, the manager of the server 20 and/or the user of the terminal device 10 understand the software updating status via the updating message.

Figure 8:
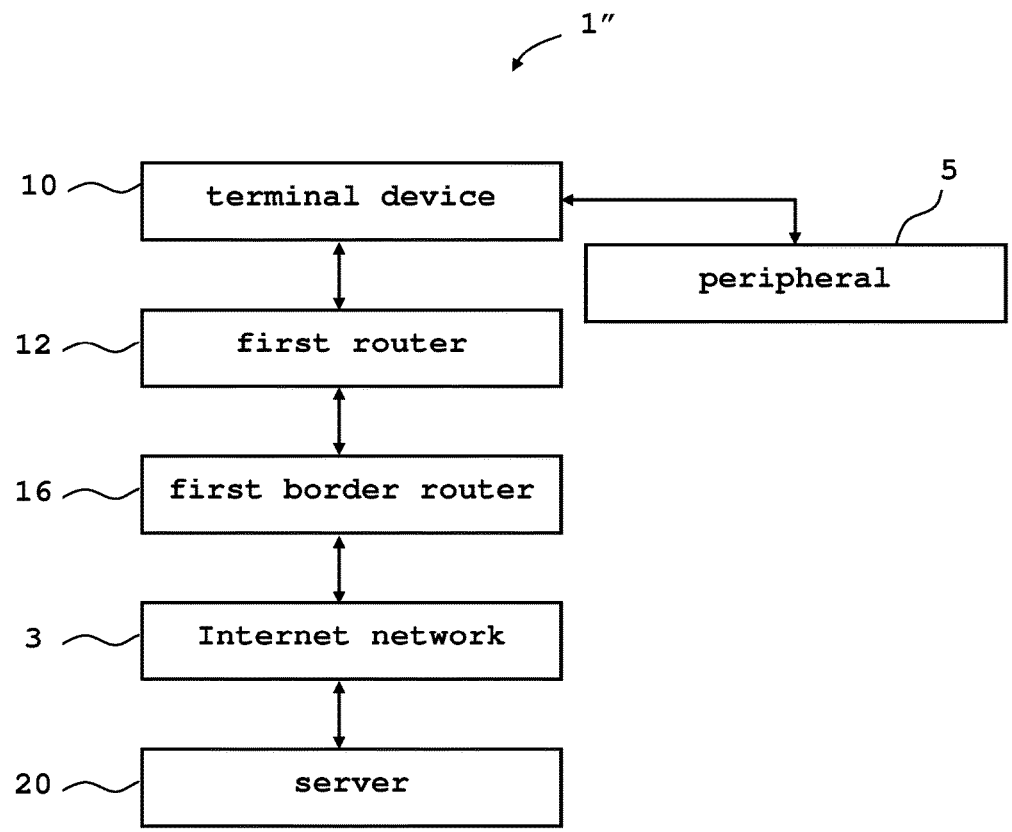
FIG. 8 is a functional block diagram of a peripheral coupled to the terminal device of the network system of FIG. 6.
Figure 9:
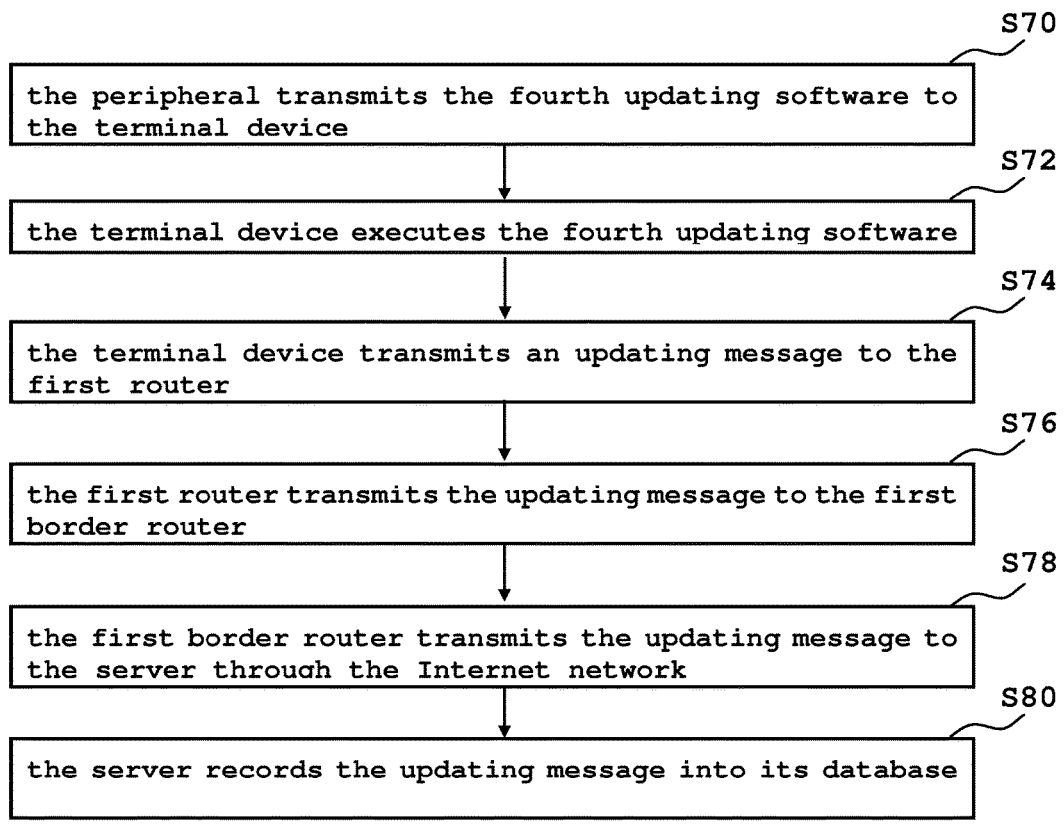
FIG. 9 is a flowchart of a software updating method according to another embodiment of the present invention.

Please refer to FIG. 8 and FIG. 9. FIG. 8 is a functional block diagram of a peripheral 5 coupled to the terminal device 10 of the network system 1" of FIG. 6. FIG. 9 is a flowchart of a software updating method according to another embodiment of the present invention. The software updating method of FIG. 9 is applicable to the network system 1" and the peripheral 5 of FIG. 6. In the embodiment of the present invention, the user may couple the peripheral 5 to the terminal device 10 as shown in FIG. 8 so that a fourth updating software can be transmitted from the peripheral 5 directly to the terminal device 10 as shown in step S70 of FIG. 9. The terminal device 10 then receives and executes the fourth updating software as shown in step S72 of FIG. 9. In other words, in the embodiment of the present invention the updating software may be transmitted to the terminal device 10 from the server 20 or directly from the peripheral 5. Please note that in the embodiment the network system 1" of FIG. 8 may be replaced with the network system 1 of FIG. 1 or the network system 1' of FIG. 4. The peripheral 5 may be a computer, a server or other types of electronic device depending upon actual applications.

Moreover, once the terminal device 10 executes the fourth updating software, the terminal device 10 may further transmit an updating message indicating success of software updating to the first router 12 as shown in step S74 of FIG. 9. The first router 12 transmits the updating message to the first border router 16 as shown in step S76 of FIG. 9. The first border router 16 then transmits the updating message to the server 20 through the Internet network 3 as shown in step S78 of FIG. 9. Finally the server 20 records the updating message into its database as shown in step S80 of FIG. 9. By this, the manager of the server 20 and/or the user of the terminal device 10 understand the software updating status via the updating message.

Please note that the control logic of the software updating method described in each embodiment may be implemented by software design. Of course, each part or function of the control logic may be implemented by software, hardware or the combination thereof.

In sum, the server transmits the updating software to the terminal device through plural paths of the border routers and the routers, and the terminal device executes the updating software only when the terminal device determines that the version information of the updating software received from different paths are identical. To the contrary, the terminal device would not execute the updating software when the terminal device determines the version information of the updating software received from different paths are not identical or the updating software is received only from a single path. By this, the updating software is correctly transmitted, received and executed, and undesired or malicious software updating by a third party can be avoided. In addition, when the connection between the border router and the main router coupled to the terminal device is interrupted, the border router is still able to transmit the updating software to the main router eventually through another router coupled to the main router. When the router is supposed to transmit the updating software to the terminal device but the terminal device is in the sleep mode, the router would keep the updating software in a queue. Once the terminal device is awakened from the sleep mode, the router then transmits the updating software kept in the queue to the terminal device. Software updating of the terminal device may even be completed by simply coupling a peripheral with the updating software to the terminal device.

Those skilled in the art will readily observe that numerous modifications and alterations of the system and method may be made while retaining the teachings of the invention.

What is claimed is:

1. A network system comprising:
    a terminal device;
    a first router coupled to the terminal device;
    a second router coupled to the terminal device;
    a first border router coupled to the first router;
    a second border router coupled to the second router; and
    a server communicating with the first border router and the second border router through an Internet network,
    wherein the server transmits a first updating software to the first border router and the second border router, respectively, through the Internet network, the first border router transmits the first updating software to the first router and the second border router transmits the first updating software to the second router, the first router transmits the first updating software to the terminal device and the second router transmits the first updating software to the terminal device, the terminal device determines whether a first version information of the first updating software received from the first router and a second version information received from the second router are identical, and when the first version information of the first updating software received from the first router and the second version information received from the second router are identical, the terminal device executes the updating software, or when the first version information of the updating software received from the first router and the second version information received from the second router are not identical, the terminal device does not execute the updating software.

2. The network system of claim 1, wherein after the terminal device executes or determines not to execute the updating software, the terminal device transmits an updating message to the first router and the second router, respectively, the first router transmits the updating message to the first border router and the second router transmits the updating message to the second border router, the first border router transmits the updating message to the server through the Internet network and the second border router transmits the updating message to the server through the Internet network, the server determines whether a first version information of the updating message received from the first border router and a second version information received from the second border router are identical, and when the first version information of the updating message received from the first border router and the second version information received from the second border router are identical, the server records the updating message into a database, or when the first version information of the updating message received from the first border router and the second version information received from the second border router are not identical, the server does not record the updating message.

3. The network system of claim 1, wherein the first border router is further coupled to the second router, the second router is further coupled to the first router, the server transmits a second updating software to the first border router through the Internet network, when connection between the first border router and the first router is interrupted, the first border router transmits the second updating software to the second router, the second router transmits the second updating software to the first router, the first router transmits the second updating software to the terminal device, and the terminal device executes the second updating software after the terminal device receives the second updating software.

4. The network system of claim 3, wherein after the terminal device executes the second updating software, the terminal device transmits an updating message to the first router, the first transmits the updating message to the second router, the second router transmits the updating message to the first border router, the first border router transmits the updating message to the server through the Internet network, and the server records the updating message into a database.

5. The network system of claim 1, wherein the server transmits a third updating software to the first border router through the Internet network, the first border router transmits the third updating software to the first router, the first router transmits the third updating software to the terminal device, and the terminal device executes the third updating software after the terminal device receives the third updating software.

6. The network system of claim 5, wherein after the terminal device executes the third updating software, the terminal device transmits an updating message to the first router, the first router transmits the updating message to the first border router, the first border transmits the updating message to the server through the Internet network, and the server records the updating message into a database.

7. The network system of claim 5, wherein the first router keeps the third updating software in a queue when the terminal device is in a sleep mode, and the first router transmits the third updating software kept in the queue to the terminal device when the terminal device is awakened from the sleep mode.

8. The network system of claim 7, wherein after the terminal device executes the third updating software, the terminal device transmits an updating message to the first router, the first router transmits the updating message to the first border router, the first border transmits the updating message to the server through the Internet network, and the server records the updating message into a database.

9. The network system of claim 1, wherein a peripheral is coupled to the terminal device and transmits a fourth updating software to the terminal device, the terminal device executes the fourth updating software after the terminal device receives the fourth updating software, the terminal device then transmits an updating message to the first router, the first router transmits the updating message to the first border router, the first border router transmits the updating message to the server through the Internet network, and the server records the updating message into a database.

10. A software updating method comprising:
    transmitting a first updating software from a server to a first border router and a second border router, respectively, through an Internet network;
    transmitting the first updating software from the first border router to a first router and transmitting the first updating software from the second border router to a second router;
    transmitting the first updating software from the first router to a terminal device and transmitting the first updating software from the second router to the terminal device;
    determining whether a first version information of the first updating software received from the first router and a second version information received from the second router by the terminal device are identical; and
    executing the first updating software by the terminal device when the first version information of the first updating software received from the first router and the second version information received from the second router by the terminal device are identical; or determining not to execute the first updating software by the terminal device when the first version information of the first updating software received from the first router and the second version information received from the second router by the terminal device are not identical.

11. The software updating method of claim 10, further comprising:
transmitting an updating message from the terminal device to the first router and the second router, respectively, after executing or determining not to execute the first updating software by the terminal device;
transmitting the updating message from the first router to the first border router and transmitting the updating message from the second router to the second border router;
transmitting the updating message from the first border router to the server through the Internet network and transmitting the updating message from the second border router to the server through the Internet network;
determining whether a first version information of the updating message received from the first border router and a second version information received from the second border router by the server are identical; and
recording the updating message in a database by the server when the first version information of the updating message received from the first border router and the second version information received from the second border router are identical; or determining not to record the updating message into the database by the server when the first version information of the updating message received from the first border router and the second version information received from the second border router are not identical.

12. The software updating method of claim 10, further comprising:
transmitting a second updating software from the server to the first border router through the Internet network;
transmitting the second updating software from the first border router to the second router when connection between the first border router and the first router is interrupted;
transmitting the second updating software from the second router to the first router;
transmitting the second updating software from the first router to the terminal device; and
executing the second updating software by the terminal device after the terminal device receives the second updating software.

13. The software updating method of claim 12, further comprising:
transmitting an updating message from the terminal device to the first router after executing the second updating software by the terminal device;
transmitting the updating message from the first router to the second router;
transmitting the updating message from the second router to the first border router;
transmitting the updating message from the first border router to the server through the Internet network; and
recording the updating message into a database by the server.

14. The software updating method of claim 10, further comprising:
transmitting a third updating software from the server to the first border router through the Internet network;
transmitting the third updating software from the first border router to the first router;
transmitting the third updating software from the first router to the terminal device; and
executing the third updating software by the terminal device after the terminal device receives the third updating software.

15. The software updating method of claim 14, further comprising:
transmitting an updating message from the terminal device to the first router after executing the third updating software by the terminal device;
transmitting the updating message from the first router to the first border router;
transmitting the updating message from the first border router to the server through the Internet network; and
recording the updating message into a database by the server.

16. The software updating method of claim 14, further comprising:
keeping the third updating software in a queue by the first router when the terminal device is in a sleep mode; and
transmitting the third updating software kept in the queue to the terminal device by the first router when the terminal device is awakened from the sleep mode.

17. The software updating method of claim 16, further comprising:
transmitting an updating message from the terminal device to the first router after executing the third updating software by the terminal device;
transmitting the updating message from the first router to the first border router;
transmitting the updating message from the first border router to the server through the Internet network; and
recording the updating message into a database by the server.

18. The software updating method of claim 10, further comprising:
coupling a peripheral to the terminal device and transmitting a fourth updating software from the peripheral to the terminal device;
executing the fourth updating software by the terminal device after the terminal device receives the fourth updating software;
transmitting an updating message from the terminal device to the first router;
transmitting the updating message from the first router to the first border router;
transmitting the updating message from the first border router to the server through the Internet network; and
recording the updating message into a database by the server.

* * * * *